United States Patent [19]
Horii et al.

[11] Patent Number: 5,140,430
[45] Date of Patent: Aug. 18, 1992

[54] FACSIMILE APPARATUS WITH SELECTION BETWEEN MULTIPLE RECORDING DEVICES BASED ON A CALCULATED LENGTH OF INFORMATION TO BE RECORDED

[75] Inventors: Masakuni Horii, Ohtsu; Masaaki Kohori, Joyo; Eiichi Morimoto; Mutsuaki Takahashi, both of Kyoto, all of Japan

[73] Assignee: Murata Kikai Kabushiki Kaisha, Kyoto, Japan

[21] Appl. No.: 466,588

[22] Filed: Jan. 17, 1990

[30] Foreign Application Priority Data

Jan. 19, 1989 [JP] Japan .................................. 1-4945[U]
Feb. 3, 1989 [JP] Japan ................................ 1-12532[U]
Mar. 20, 1989 [JP] Japan ................................ 1-31949[U]

[51] Int. Cl.$^5$ ...................... H04N 1/23; H04N 1/29; H04N 1/21; H04N 1/32
[52] U.S. Cl. .................................. 358/296; 358/300; 358/449
[58] Field of Search .............. 358/296, 300, 451, 434, 358/468, 449; 346/76 PH, 160; 355/202

[56] References Cited

U.S. PATENT DOCUMENTS

| 4,924,324 | 5/1990 | Takaoka | 358/468 |
| 4,930,017 | 5/1990 | Izawa | 358/296 |
| 4,939,541 | 7/1990 | Sugiura | 346/76 PH |

*Primary Examiner*—George H. Miller, Jr.
*Assistant Examiner*—Scott A. Rogers
*Attorney, Agent, or Firm*—Spensley, Horn, Jubas & Lubitz

[57] ABSTRACT

A recording device in a facsimile apparatus which includes a first recording device and a second recording device. It is capable of selecting which one of the first and second recording devices is made to carry out recording.

4 Claims, 11 Drawing Sheets

FIG. 6

| PAPER SIZE | PAPER CODE | TOTAL NUMBER OF LINES IN STANDARD MODE | TOTAL NUMBER OF LINES IN FINE MODE | TOTAL NUMBER OF LINES IN S FINE MODE |
|---|---|---|---|---|
| B5 | 01 | 990 | 1979 | 3958 |
| A4 | 02 | 1144 | 2287 | 4574 |
| B4 | 03 | 1402 | 2803 | 5606 |
| A3 | 04 | 1617 | 3234 | 6468 |
| -- | -- | ---- | ---- | ---- |
| -- | -- | ---- | ---- | ---- |

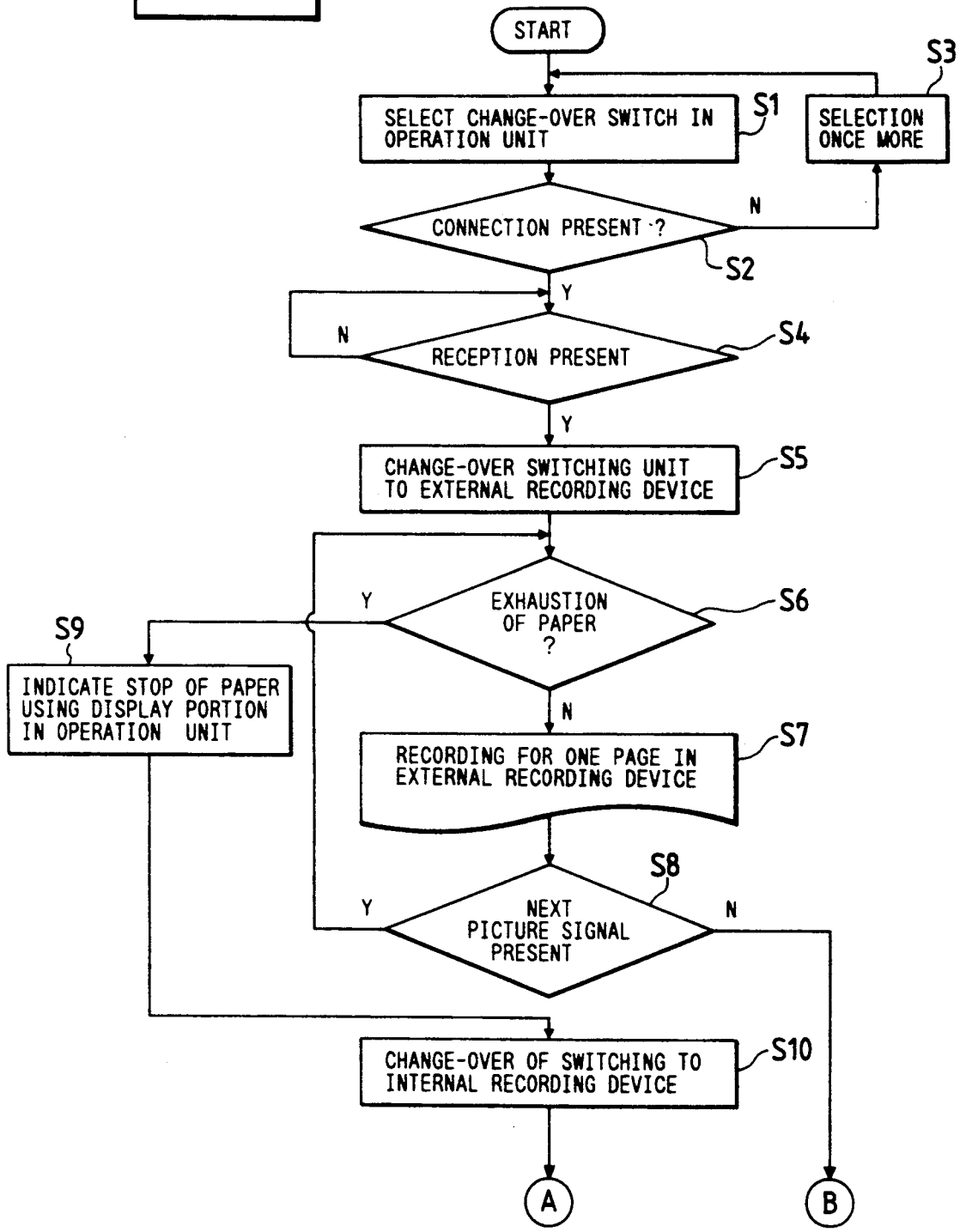

FACSIMILE APPARATUS WITH SELECTION BETWEEN MULTIPLE RECORDING DEVICES BASED ON A CALCULATED LENGTH OF INFORMATION TO BE RECORDED

FIELD OF THE INVENTION

The present invention relates to a facsimile apparatus, and particularly to a recording device in the apparatus concerned.

RELATED ART STATEMENT

In general, in a facsimile apparatus, as an example, there are available one having a thermal printer (For example, heat-sensitive recording) using a heat-sensitive paper and one having a printer (For example, an electrophotographic or heat transfer recording) using a plain paper as a recording device which records a piece of received information.

A facsimile apparatus has been generally provided with either the thermal printer using a heat-sensitive paper or the printer using a plain paper described above.

Nevertheless, in the above-mentioned recording device, a heat-sensitive paper has been cheap in running cost, but deterioration due to discoloration has been caused by change with passage of time. On the other hand, a plain paper has been subjected to little amount of discoloration due to change with passage of time and able to be preserved for a long time, but expensive in running cost.

While, as a recording device for recording a received piece of information in a facsimile apparatus, there are available one using a roll paper of continuous length (continuous paper) and one using a standardized single paper (cut paper).

In general, a conventional recording device has a construction capable of employing only either one of a roll paper of continuous length and a standardized single paper.

Accordingly, in the recording device described above, a user has not been able to change a paper employed in a recording device of a facsimile apparatus from a single paper to a continuous paper, and, to the contrary, from a continuous paper to a single paper.

By the way, in the case where a user who purchases a facsimile apparatus using a single paper often uses a special slip and mainly transmits a piece of information corresponding to half or so of a paper of A4 size, a standardized single paper is wasteful in its use if the state of his business is considered. But, in the present condition, the use of a continuous paper can not be changed without replacing the facsimile apparatus itself by purchase.

Accordingly, the present invention is devised in consideration of the above-mentioned affairs, and it is an object of the present invention to provide a recording device which can select use of a paper in accordance with its use.

In order to solve the above-mentioned problems, the present invention is provided with a first recording device using a heat-sensitive paper and a second recording device using a plain paper, and implemented so as to be able to select, from the transmitter side, which one of the recording devices described above be made to carry out recording.

Furthermore, according to another embodiment of the present invention, a recording device may be selected based on the length of a manuscript.

One embodiment of the present invention may include a first recording device using a roll paper of continuous length, a second recording device using a standardized single paper, a length calculating means for calculating the length of a picture image on a received manuscript, and a switching unit for switching-over the above-mentioned recording devices based on the length of the picture image on the manuscript calculated by the length calculating means concerned.

Still another embodiment of the present invention relates to a facsimile apparatus having a built-in recording device, and connecting an external recording device, wherein selection of either of the recording devices may be carried out.

BRIEF DESCRIPTION OF DRAWINGS

FIG. 6 is a diagram showing a storing area of a paper length memory unit;

DETAILED DESCRIPTION OF PREFERRED EMBODIMENTS

A first embodiment of the present invention is provided with a first recording device using a heat-sensitive paper and a second recording device using a plain paper, and implemented so as to be able to select, from the transmitter side, which one of the recording devices described above be made to carry out recording.

Hereinafter, the first embodiment of a recording device in a facsimile apparatus according to the present invention will be described with reference to accompanying drawings.

Figure 1:
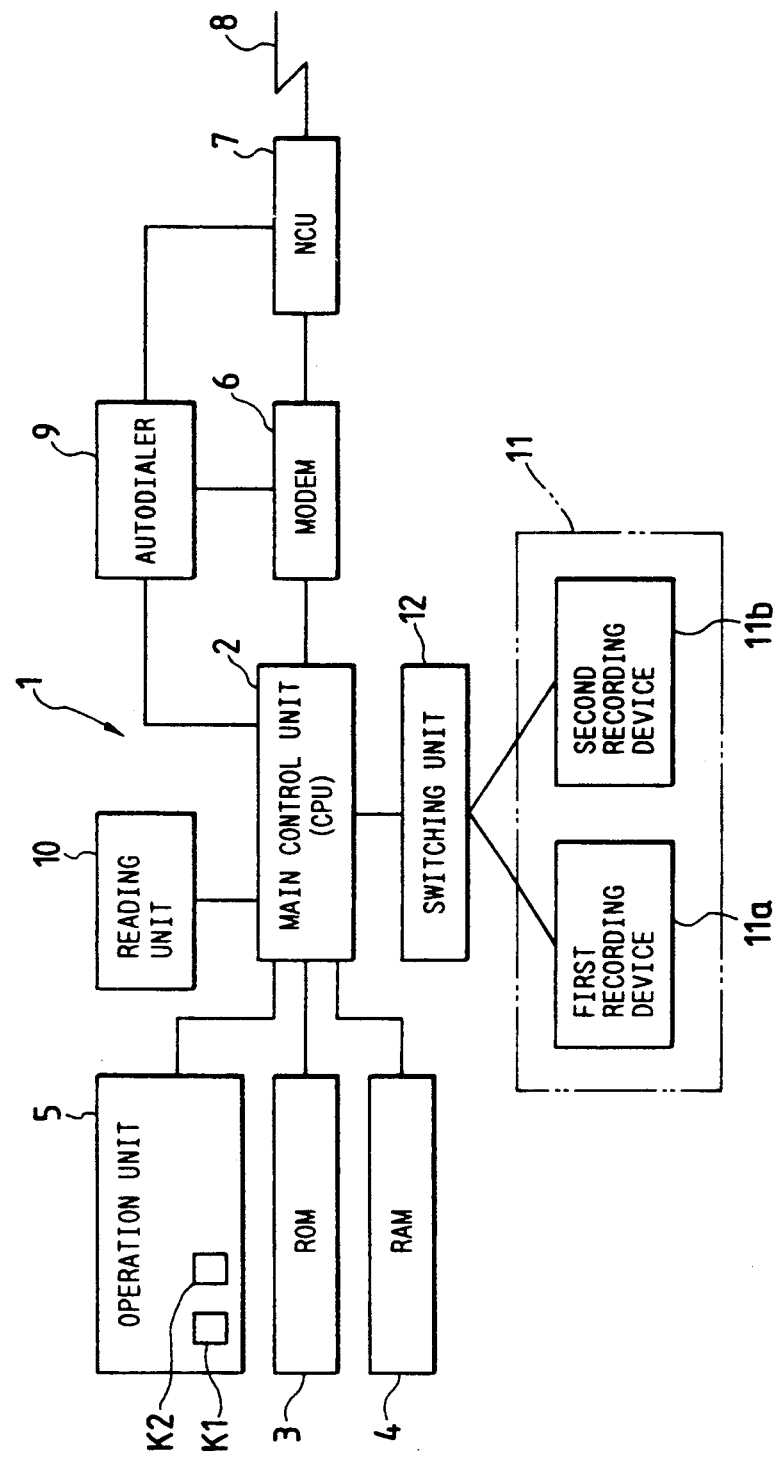
FIG. 1 is a block diagram showing an embodiment of a facsimile apparatus related to the present invention.

FIG. 1 is a block diagram showing an electrical configuration of a facsimile apparatus 1.

Reference numeral 2 is a main control unit comprising a microcomputer, that is, a CPU, 3 a ROM which stores operation programs for the present facsimile apparatus, and 4 a RAM which stores various kinds of data caused by being accompanied with the progress of the programs concerned. Reference numeral 5 is an operation unit for carrying out various input operations such as command for transmission/reception and the like and provided with recording specification switches K1 and K2. Reference numeral 6 is a modulation/demodulation device, that is, a modem, and numeral 7 is a network control unit, that is, NCU, via which the modem 6 is connected to a circuit 8. Reference numeral 9 is an autodialer, and the autodialer 9 concerned loads a dial number (a telephone number of a remote individual) registered in the RAM 4 beforehand and outputs a signal corresponding to the dial number concerned to the NCU 7, which outputs the signal concerned to the circuit 8, thereby connecting the circuit.

Reference numeral 10 is a reader which reads out picture information on a manuscript, converts the read out picture information into binary electrical signals showing white and black, and outputs the binary signals. Reference numeral 11 is a recording device for printing out received picture information on a recording paper, 11a is a first recording device having a thermal printer using a heat-sensitive paper, and 11b is a second recording device having a printer using a plain paper. Reference numeral 12 is a switching unit for switching the receiver picture information into the recording device 11a or 11b.

Here, the recording device 11 will be concretely described. The first recording device 11a adopts what we call a heat-sensitive recording system in which a picture image is obtained through primary coloring of a heat-sensitive paper due to generation of heat of a thermal printer. It has a merit that its construction is simple, and also a heat-sensitive paper can be made at low cost in view of running cost. Incidentally, a heat-sensitive paper is usually employed in a form of a wound roll paper of continuous length (continuous paper), and the device 11a concerned is equipped with a cutter.

The second recording device 11b adopts what we call an electrophotographic recording system in which a picture image is obtained on a plain paper through processes such as development, fixation, and the like using magnetic toner. It allows high speed recording, and a plain paper on which a picture is recorded can be reserved for a long time. Incidentally, a plain paper is usually employed in a form of a single paper (cut paper).

By the way, another example of the second recording device 11b, what we call a heat-sensitive recording system may be adopted, in which a heat-sensitive film coated with heat-fused ink is heated from the rear surface by a thermal head to melt the ink, and the ink is transferred to a plain paper. This system makes processes such as development, fixation, and the like unnecessary, thereby allowing a construction of a recording device to be simplified.

The switching of the first recording device 11a and the second recording device 11b in the receiving side is directed by selection of the recording specifying switches K1 and K2 provided in the operation unit 5 by an operator in the transmitting side. For instance, the switch K1 is depressed and operated when a sending manuscript is wanted to be recorded on a plain paper in the receiving side because it is an important document, and K2 is depressed and operated when a sending manuscript is wanted to be recorded on a heat-sensitive paper because it is not so important document, that is, it is an ordinary document.

Next, the operation of the facsimile apparatus in the present invention will be described.

Figure 2:
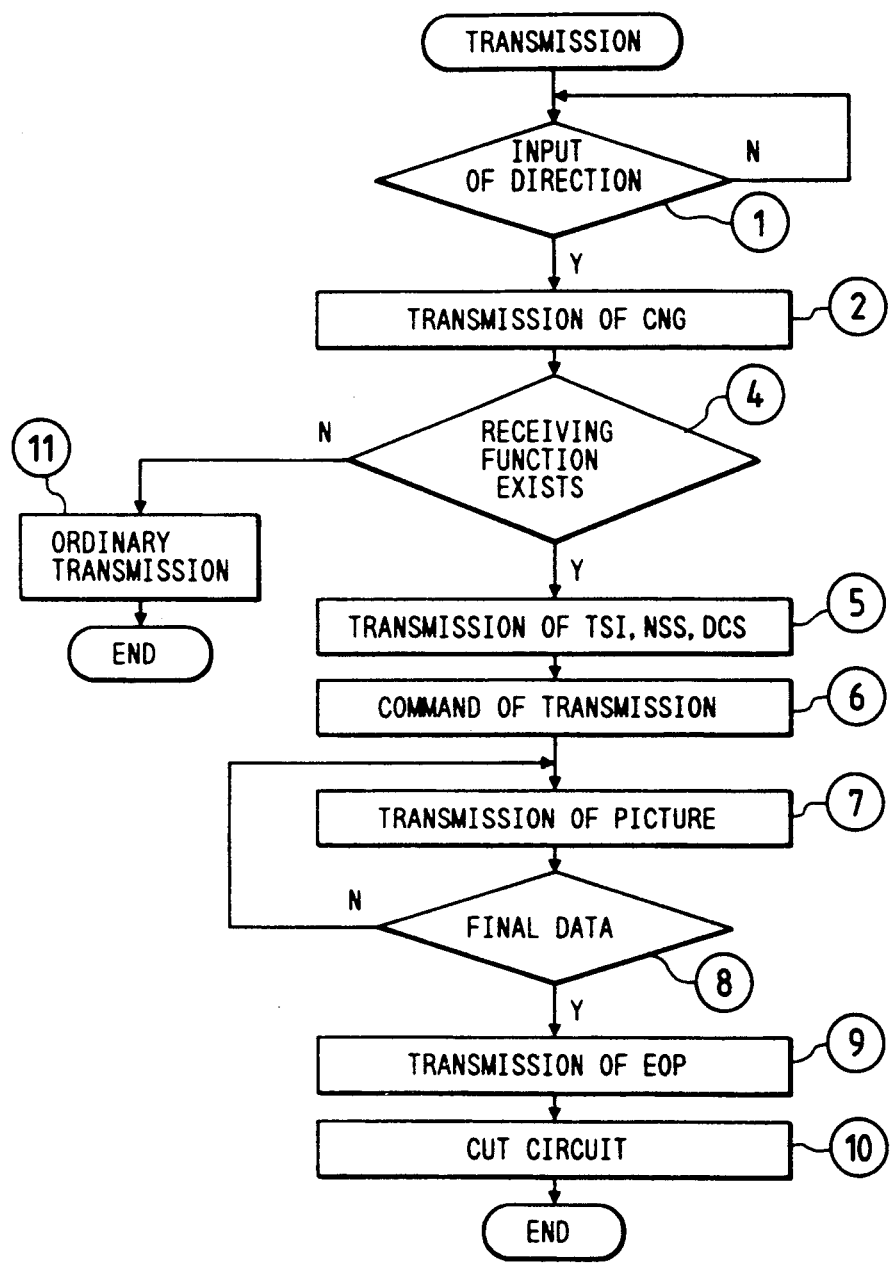
FIG. 2 and FIG. 3 each are a flowchart showing an operation procedure of the present invention.
Figure 3:
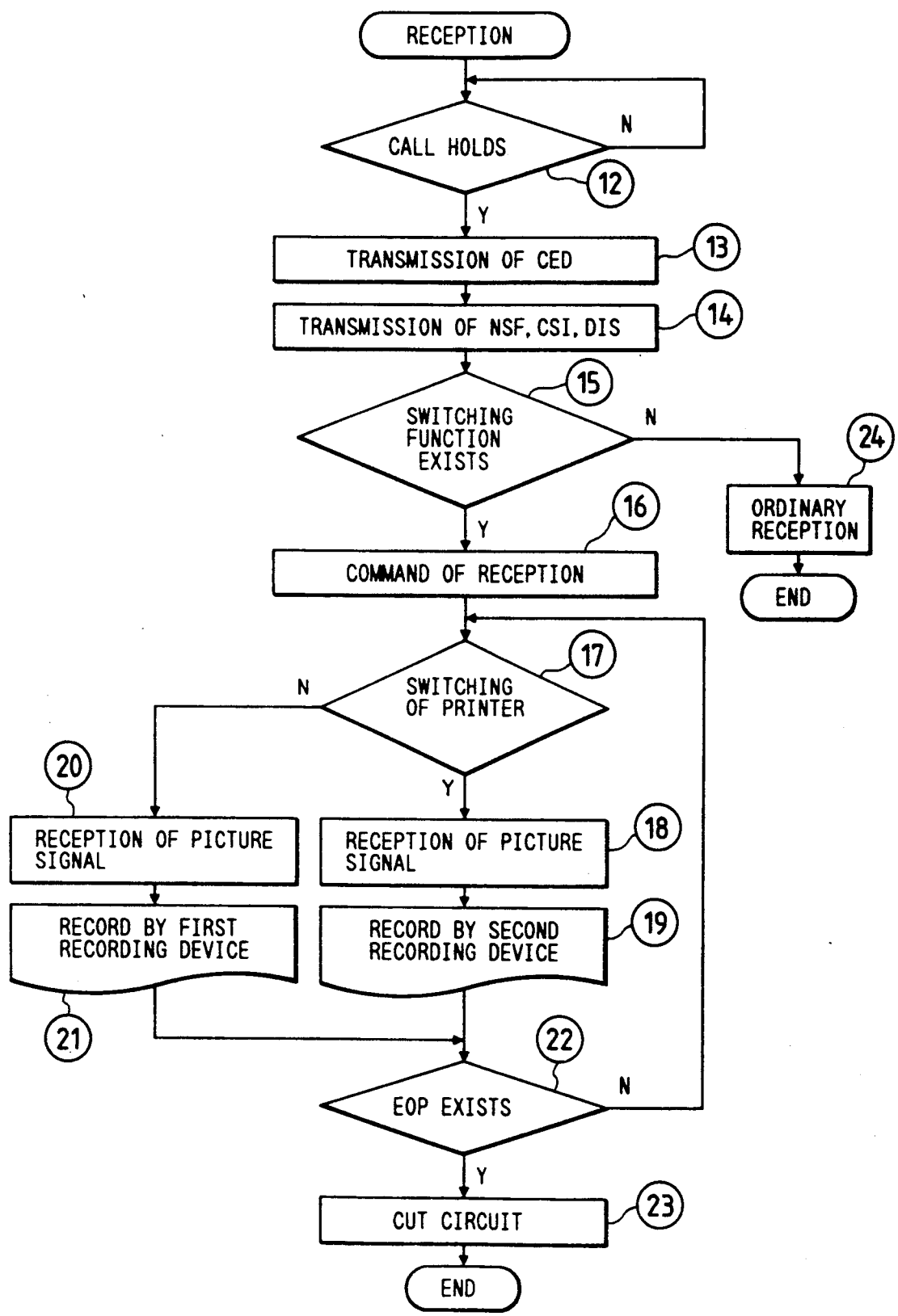
Figure 4:
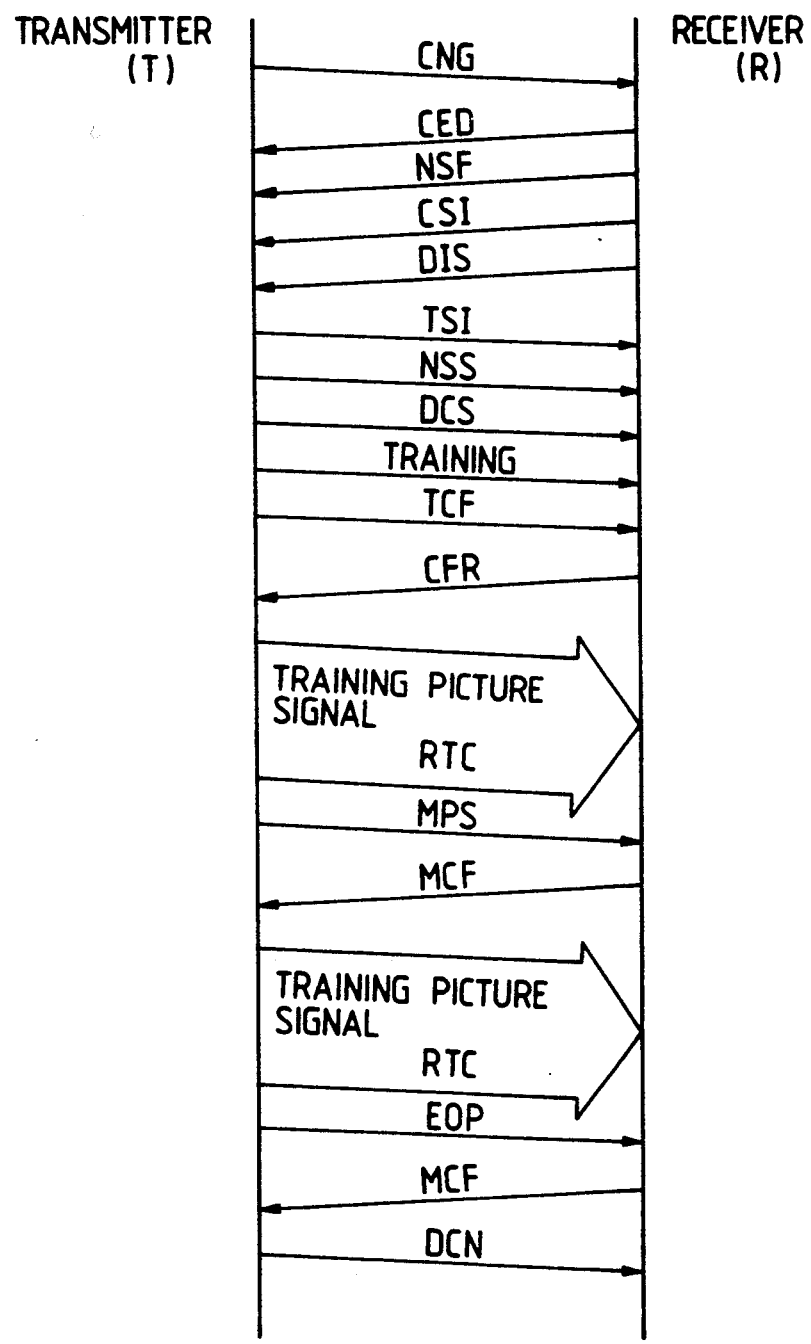
FIG. 4 is a diagram explanatory of a communication means between a transmitter and a receiver of a facsimile apparatus.

FIG. 2 and FIG. 3 are flowcharts which assist in explaining the operation of the present embodiment, FIG. 4 is a diagram showing a procedure of communication between a transmitter T and a receiver R both based on the GIII mode of CCITT.

At first, an operator sets a sending manuscript to the reader 10 in the transmitter T and selects the recording specifying switches K1 and K2. Then, a distant dial number (or compacted number) is input (Step ①), a ringing (CNG) is sent out from the transmitter T (Step ②), and a called station identification signal (CED) for indicating that the circuit is connected (Step ①②) is sent out (Step ①③) from the receiver R, and furthermore, a non-standard function identification signal (NSF) for indicating an optional function, a called station identification signal (CSI) for indicating a telephone number, and a digital identification signal (DIS) for indicating CCITT standards are sent out from the receiver R, respectively. (Step ①④). In the transmitter T, if any signal which shows that it has the function of the present invention is present in the signal (NSF) (Step ④), a bit for specification of recording by the printer is made to stand in a non-standard function setting signal (NSS) indicating an optional function, for example, the bit is made 1 for the recording specification switch K1 and made 0 for the recording specification switch K2, and the bit is sent out to the receiver R together with a transmitting station identification signal (TSI) for indicating telephone numbers and a digital command signal (DCS) indicating the CCITT standard. (Step ⑤).

After the training signal and a circuit check signal (TCF) are sent out from the transmitter T (Step ⑥), and a reception ready confirmation signal (CFR) is sent out from the receiver R (Step ①⑥), a picture signal for the first page of a manuscript is transmitted from the transmitter T (Step ⑦). In the receiver R, when a switching unit 12 is switched to the first recording device 11a or the second recording device 11b correspondingly to the bit for specification of recording in the signal (NSS) (Step ①⑦) to receive the picture signal from the transmitter T(Step ①⑧, Step ②⓪), the picture signal concerned is printed out on a recording paper as a received picture image (Step ①⑨, Step ②①).

A picture signal end signal (RTC) is sent out at the time point when the picture signal for the first page is transmitted, and then a multipage signal (MPS) is sent out from the transmitter T when the manuscript of a plurality of sheets continues (Step ⑧). In response to this, a message confirmation signal (MCF) is sent out from the receiver R, and then the communication of the picture signal for the second page of the manuscript is carried out. When the communication of the picture signal ends, a procedure end signal (EOP) is send out from the transmitter T (Step ⑨, Step ②②), and a message confirmation signal (MCF) and a circuit cut command (DCN) are sent out from the receiver R and the transmitter T, respectively, (Step ①⓪, Step ②③), thereby ending overall communication.

Incidentally, in the case where the receiver R has not the present function, the process proceeds from Step ④ to the ordinary transmission (Step ①①) in the transmitter T side, and the process proceeds from Step ①⑤ to the ordinary reception in the receiver R side (Step ②④), thereby carrying out the conventional facsimile communication.

According to the present embodiment as described above, since the first recording device 11a using a heat-sensitive paper and the second recording device 11b using a plain paper are provided as the recording device 11 in the facsimile apparatus 1, and at the same time, it can be selected from the transmitter side that which one of the recording devices described above be used, for example, it can be specified that when the sending manuscript is an ordinary document, it is made to record using a heat-sensitive paper. Accordingly, a picture image which has been recorded on a plain paper can be reserved for a long time, and the record on a heat-sensitive paper can be obtained at a low cost, thereby improving convenience. Since the specification of the recording device from the transmitting side is carried out by a facsimile control signal, it is possible to switch-over the recording devices even if no operator is in the receiving side, in other words, the receiving side is in an automatic reception state.

Incidentally, in the embodiment described above, when a sending manuscript has a plurality of sheets, the recording specifying switches K1 and K2 are depressed and operated during the transmission of one page of the manuscript, thereby allowing the recording device 11 for the subsequent pages to be altered. In other words, the switching-over is checked for each one page in Step ①⑦, thereby switching-over the printers.

Also, in the facsimile apparatus 1 according to the embodiment described above, when there is not the specification of recording from the transmitting side, the first recording device (11a) has priority. If the recording device concerned (11a) can not record due to exhaustion of paper and the like, recording is carried out by the second recording device 11b. Incidentally, the second recording device 11b may be made to have priority.

Though, in the embodiment described above, the description is given assuming that the heat-sensitive paper and the plain paper are a roll paper of continuous length and a single paper, respectively, the former and the latter may be, of course, a single paper and a roll paper of a continuous length, respectively.

As described in detail above, according to the embodiment of the present invention, the first recording device using a heat-sensitive paper and the second recording device using a plain paper are provided as recording devices in a facsimile apparatus, and at the same time, the facsimile apparatus can select which one of the recording devices should be made to employ from the transmitting side, and when a sending manuscript is an important document, recording is carried out using a plain paper and when a sending manuscript is an ordinary document, recording can be carried out using a heat-sensitive paper, which is very convenient.

A second embodiment of the present invention comprises a first recording device using a roll paper of continuous length, a second recording device using a standardized single paper, a length calculating means for calculating the length of a picture image on a received manuscript, and a switching unit for switching-over the above-mentioned recording devices based on the length of the picture image on the manuscript calculated by the length calculating means concerned.

Hereinafter, the second embodiment of a recording device in a facsimile apparatus according to the present invention will be described with reference to accompanying drawings.

Figure 5:
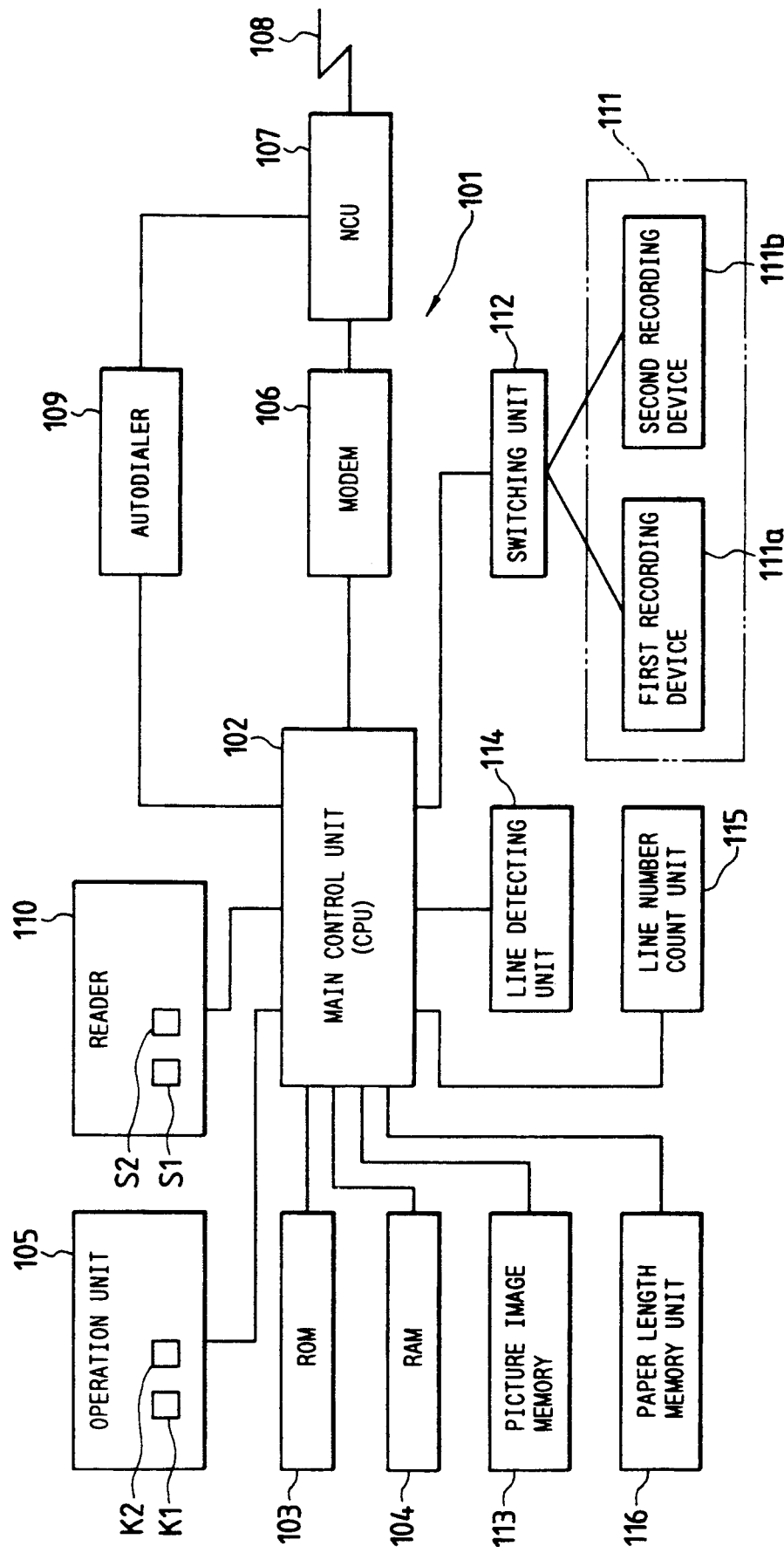
FIG. 5 is a block diagram showing an another embodiment of a facsimile apparatus related to the present invention.

FIG. 5 is a block diagram showing an electrical configuration of a facsimile apparatus 101.

Reference numeral 102 is a main control unit comprising a microcomputer, that is, a CPU, 103 a ROM which stores operation programs for the present facsimile apparatus, and 104 a RAM which stores various kinds of data caused by being accompanied with the progress of the programs concerned. Reference numeral 105 is an operation unit for carrying out various input operations such as command for transmission/reception and the like and provided with recording specification switches K1 and K2. Reference numeral 106 is a modulation/demodulation device, that is, a modem, and reference numeral 107 is a network control unit, that is, NCU, via which the modum 106 is connected to a circuit 108. Reference numeral 109 is an autodialer, and the autodialer 109 concerned loads a dial number (a telephone number of a remote individual) registered in the RAM 104 beforehand and outputs a signal corresponding to the dial number concerned to the NCU 107, which outputs the signal concerned to the circuit 108, thereby connecting the circuit.

Reference numeral 110 is a reader which reads out information on a manuscript, converts the read picture information into binary electrical signals showing white and black, and outputs the binary signals. The reader 110 is provided with a paper width detecting sensor S1 for detecting a paper width of a manuscript in the main scanning direction and a paper detecting sensor S2 for detecting the presence or absence of a manuscript on its read area.

Reference numeral 113 is a picture image memory comprising RAMs which sorts the picture information read by the reader 110 for the manuscript in transmission or the picture information received in reception for each manuscript and stores the sorted picture information.

Reference numerals 114 and 115 each are a length calculating means for calculating the length of a picture image on a manuscript. Reference numeral 114 is a line detecting unit which outputs a line detecting signal to the main control unit 102 for each one line (each one scanning line) when the picture information is stored in the picture image memory at the time of transmission or reception.

Reference numeral 115 is a line number count unit comprising a RAM memory which stores a line number count data. When the main control unit 102 receives a detecting signal from the line detecting unit 114, the line number count data is counted up by the main control unit 102 and stored for each manuscript.

Incidentally, the line number count data is one for storing the total number of the scanning lines from the front end to the rear end of the manuscript carried over in a read area at the time of transmission. When the front end of a new manuscript is carried over in a read area, the line number count data is reset to "0", and a line number of the next manuscript is counted up from "0" again to sequentially store the total number of scanning lines for each manuscript. In reception, a line terminal code (EOL) is detected by the line detecting unit 114 to store it as a line number count data in the line number counting unit 115.

Reference numeral 116 is a paper length storing unit comprising a ROM, which replaces the length of a paper of standardized size in transmission or reception with the total number of lines and stores it. FIG. 6 shows a conversion table in which paper codes and the respective predetermined total numbers of lines (decision value) of a standard mode, a fine mode, and an S fine mode corresponding to the paper codes are mutually related. For example, the code [02] is assigned as a paper code in the case where a paper of A4 size (manuscript) is carried over in its lengthwise direction to transmit it, the decision value of the paper is related to [1144] in a standard mode, [2287] in a fine mode, and [4574] in an S fine mode correspondingly to the paper code [02]. The paper codes and the decision values are input and stored beforehand, and further as to the paper codes concerned, the paper code corresponding to the paper size is selectively specified by the main control unit 2 based on a paper width detecting signal from the paper width detecting sensor S1 in transmission and based on a detecting signal for a facsimile control signal in handshake in reception, respectively.

Reference numeral 111 is a recording device for printing out received picture information on a recording paper. Reference numeral 111a is a first recording device using a roll paper of continuous length (continuous paper) and 111b is a second recording device using a standardized single paper (cut paper). Reference numeral 112 is a switching unit which switches received picture information to the recording device 111a or 111b, and the switching is carried out based on the length of a picture image on a manuscript calculated by the length calculating means.

The first recording device 111a adopts what we call a thermosensitive recording system in which a picture image is obtained by primary coloring of a thermosensitive paper due to heat generation of a thermal head, and has a merit that its construction can be made simple. In addition, the thermosensitive paper can be inexpensive in its running cost. Incidentally, the device concerned 11a is provided with a cutter (not shown) for cutting a roll-shaped thermosensitive paper.

The second recording device 111b adopts what we call an electrophotographic recording system in which a picture image is recorded on a plain paper through processes such as development, fixation, and the like using magnetic toner. Also, it allows high speed recording, and a plain paper on which a picture is recorded can be reserved for a long time.

The change from the first recording device 11a to the second recording device 111b and vice versa in the receiving side takes place automatically by detecting the size of a manuscript of a received piece of picture information. The change takes place in the switching unit in such a manner that if the piece of picture information has the length of the manuscript corresponding to the width of the manuscript, that is, the standardized size, it is recorded on a single paper in the second recording device 11b, and if the piece of picture information has a size different from the standardized size, it is recorded on a roll paper in the first recording device.

For that reason, an operator selects record specifying switches K1 and K2 provided in the operation unit 105 in the transmitting side. For example, when a piece of picture information is wanted to be recorded on a single paper in the receiving side because a transmitting manuscript comprises standardized papers, the switch K is depressed and operated, and when a piece of picture information is wanted to be recorded on a roll paper in the receiving side because a transmitting manuscript comprises papers having various sizes, the switch K2 is depressed and operated.

Figure 7:
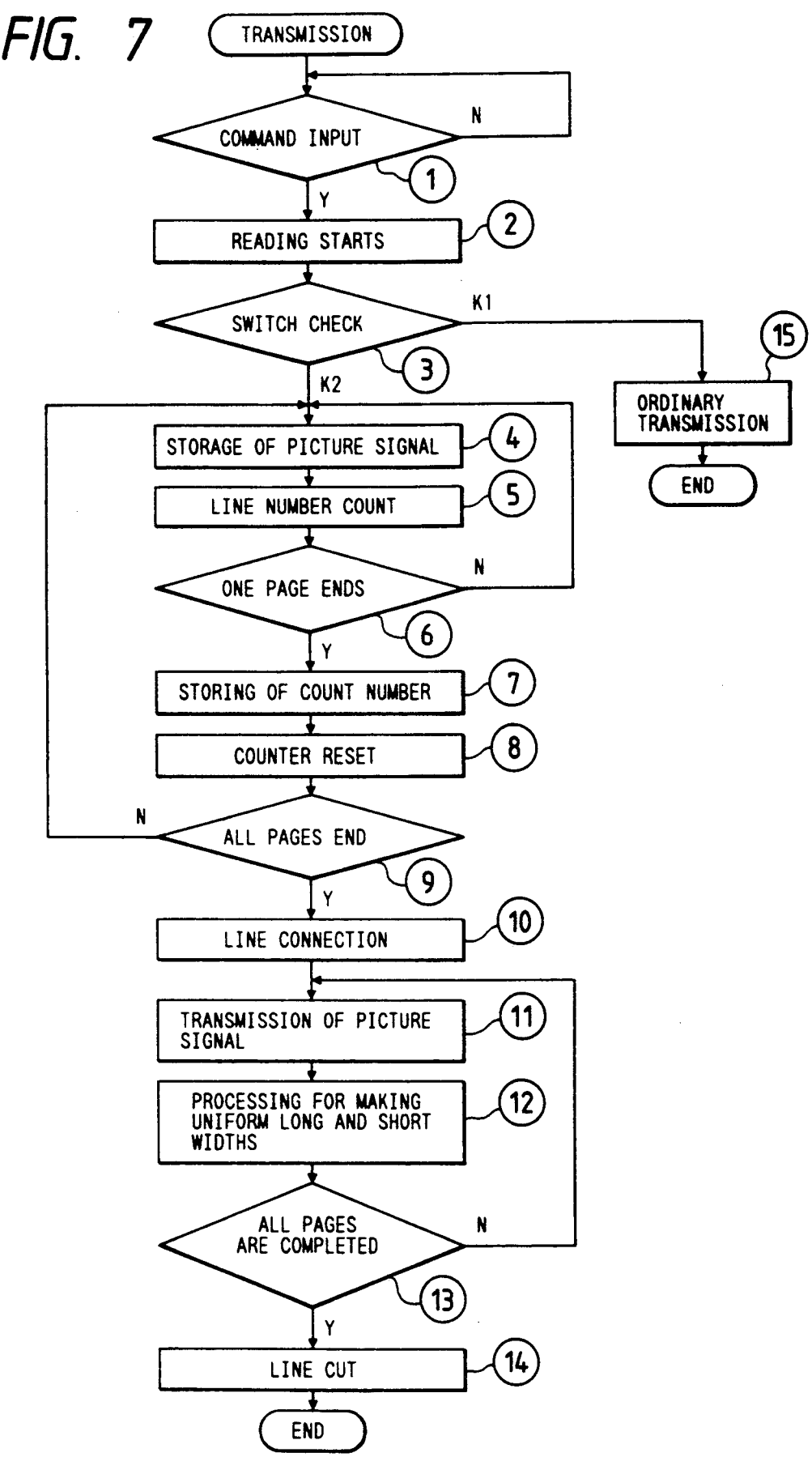
FIGS. 7 and 8 each are a flowchart showing an operation procedure of the present invention.
Figure 8:
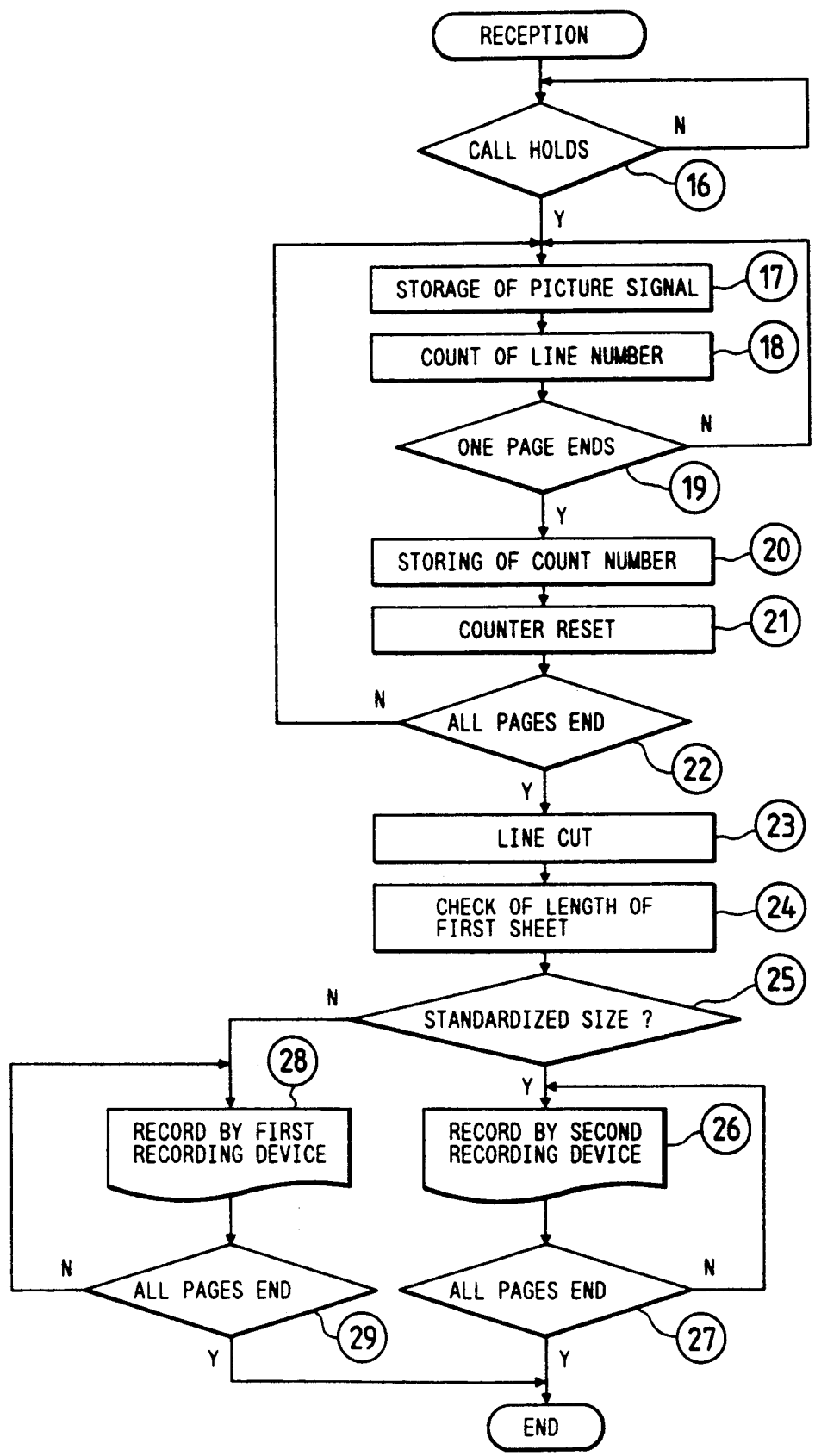

Next, the operation of the facsimile apparatus in the present invention will be described. FIG. 7 and FIG. 8 each are a flowchart explanatory of an operation procedure in the present embodiment.

At first, an operator sets a transmitting manuscript in a reader 110 of the transmitter side and selects the record specifying switch K1 or K2, and at the same time, inputs a distant dial number (or compacted number), a transmission mode, and the like (Step ①). Then, read of a manuscript is started (Step ②), and the record specifying switches K1 and K2 are checked (Step ③). If the roll paper recording switch K1 is being depressed, the procedure proceeds to Step ①⑤ and ordinary transmission takes place. To the contrary, if the single paper recording switch K2 is being depressed, the procedure proceeds to Step ④. In the Step ④, a picture signal read in the reader 110 is stored in the picture image memory 113, and at the same time, a line detecting signal is detected to the main control unit 102 for each one line by the line detecting unit 114. A line number count data which is counted up is stored in the line number count unit 115 (Step ⑤), and the above-mentioned operation is repeated until the operation for one page of the manuscript is completed (Step ⑥). When the read of one page of the manuscript and the storage of the picture signal are completed, the count number is stored in the line number count unit 115 (Step ⑦), and at the same time, the line number count data is reset to "0" (Step ⑧), and read of a subsequent manuscript and storage of a picture signal take place once more. (Step ⑨).

When the read of all pages of the transmitting manuscript and the storage of the picture signal are completed through the Steps ④ to ⑨, the line connection to the distant station input by step ① takes place (Step ①⓪, Step ①⑥), and the transmission starts (Step ①①). In this time, a piece of transmitting information is fetched from the picture image memory 113, and a line number count data is fetched from the line number count unit 115 and compared with total numbers of lines (decision value) corresponding to the paper code in the paper length memory unit 116.

If the line number count data is smaller than the total number of lines, a white signal of a dummy is inserted for lines short of the number, and if the line number count data is larger than the total number of lines, the piece of transmitting information is divided into two pages (Step ①②), and the piece of transmitting information of the total pages is transmitted (Step ①③).

On the other hand, in the receiver side, a received picture signal is stored in the picture image memory 113 (Step ①⑦), and at the same time, a line detecting signal is output to the main control unit 102 for each one line by the line detecting unit 114. A line number count data which is counted up is stored in the line number count memory unit 115 (Step ①⑧), and the above-mentioned operation is repeated until the operation for one page of the manuscript is completed (Step ①⑨). When the storage of the picture signal for one page of the received manuscript is completed, the count number is stored in the line number count unit 115 (Step ②⓪), and at the same time, the line number count data is reset to "0" (Step ②①), and the storage of a picture signal for the subsequent received manuscript is carried out once more (Step ②②). When the storage of the picture signal for all pages of the received manuscript is completed through the Steps ①⑦ to ②②, the line is cut from the transmitter side, and the transmission and reception are completed. (Step ①④, Step ②③).

Thereafter, in the receiver side, a piece of received information is fetched from the picture image memory 113, and a line number count data is fetched from the line number count unit 115 and compared with the total number of lines (decision value) corresponding to the paper code in the paper length memory unit 116 (Step ②④, Step ②⑤), and when the line number count data is equal to the total number of lines, the line number count data is recorded on a single paper in the second recording device 111b (Step ②⑥), and when the line number count data is not equal to the total number of lines, the line number count data is recorded on a roll paper in the first recording device 111a (Step ②⑧).

Incidentally, when the line number count data is compared with the numeric value of the total number of lines, even if the both values do not completely coincide with each other, for example, if the upper two digits or three digits of the both values coincide with each other, the recording device may be constituted in such a manner that the line number count data is recorded by the second recording device 111b.

Then, when the recording of the all pages of the received manuscript is completed (Step ②⑦, Step ②⑨), the recording operation ends.

As described above, according to the present embodiment, a first recording device 111a using a roll paper of continuous length and a second recording device 111b using a standardized single paper are provided as a recording device 111 in a facsimile apparatus 101, and by detecting the size of a manuscript of a piece of received picture information, the recording device is automatically changed from the first recording device to the second recording device and vice versa to record the received piece of picture information. Accordingly, recording papers employed are not wasted and the recording can be carried out with good efficiency. Also, since the change-over of the recording device is automatically carried out, even if an operator is absent in the receiving side, that is, the apparatus is in an automatic receiving state, the recording device can be changed.

Incidentally, though, the embodiment described above is described, assuming that a thermosensitive recording system is applied to the first recording device 111a using a roll paper of continuous length, and an electrophotographic recording system is applied to the second recording device 111b using a standardized single paper, it is needless to say that the thermosensitive recording system may be applied to the second recording device and the electrophotographic recording system may be applied to the first recording device without being restricted to the above description.

As described above in detail, according to the present invention, the first recording device using a roll paper of continuous length and the second recording device using a standardized single paper are provided as the recording device in the facsimile apparatus, and the recording device can be automatically changed over from the first recording device to the second recording device and vice versa by detecting the size of the manuscript of the piece of received picture information in the receiving side, by which recording papers employed are not wasted and the recording can be carried out with good efficiency.

In general, a facsimile apparatus adopts a configuration in which any one among such recording devices as shown below is built therein.

(1) A thermosensitive recording device which carries out printing on a roll-shaped thermosensitive paper using a thermal head.

(2) An electrophotographic recording device which carries out printing on a specially designed plain paper through processes such as development, fixation, and the like.

(3) A heat transfer recording device which thermally transfers a heat transfer film on a specially designed plain paper using a thermal head for printing.

(4) An ink jet recording device and the like.

But, a facsimile apparatus of a configuration having a recording device of a single body built therein as described above is provided with defects as shown below.

(1) When exhaustion of paper is generated, troublesome paper supply has to be carried out on all such occasions, by which the facsimile apparatus is inconvenient to use.

(2) Since the receiving operation (recording operation) is interrupted during exhaustion of paper, the facsimile apparatus is not suitable in the case of reception of an amount of information which is apt to be particularly requested recently.

A third embodiment of the present invention is devised in consideration of such a present state, and it is an object to provide a facsimile apparatus which connects an external recording device capable of carrying out receiving operation in succession for a long time, and consequently, capable of improving convenience in its use.

The third embodiment of the present invention relates to a facsimile apparatus having a built-in recording device, and at the same time, connecting an external recording device, which comprises a priority setting means for setting the priority between the recording operations of the recording device and the external recording device and a selection means for making either of the recording devices carry out recording operation in accordance with the priority.

According to the above-mentioned configuration, even in the case where a recording unable state due to exhaustion of paper, stop of paper, or the like occurs in either of the built-in recording device and the external recording device, the recording operation can be carried out in succession.

Figure 9:
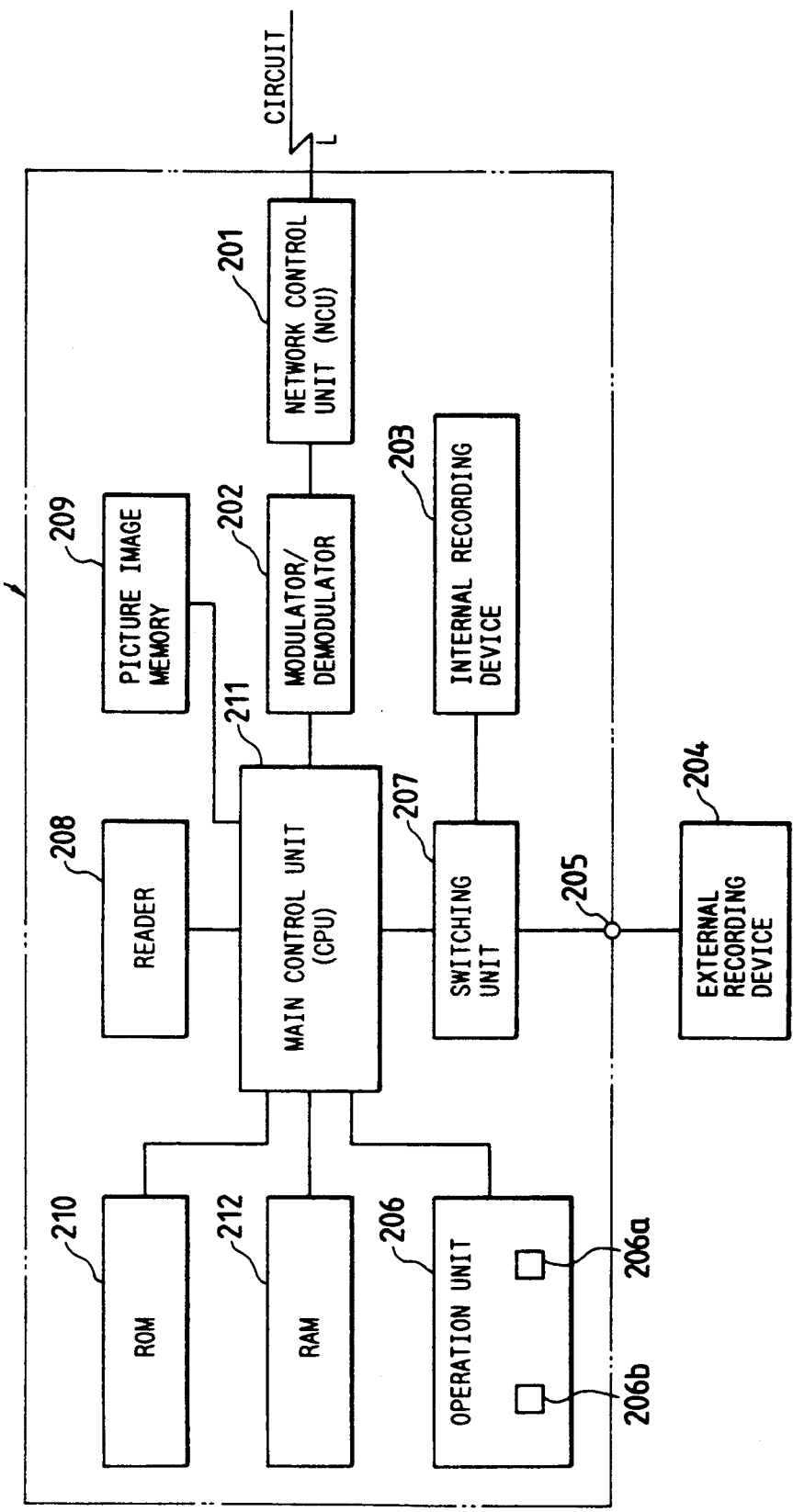
FIG. 9 is a block diagram of a facsimile according to a still another embodiment related to the present invention.

Hereinafter, the third embodiment of this invention will be described with reference to drawings. FIG. 9 is a block diagram of a facsimile apparatus of the embodiment related to the present invention.

Incidentally, lines for connecting each unit mean a data bus or lines for transmitting data in FIG. 9, and control lines or a control bus is not shown in FIG. 9. In FIG. 9, reference numeral 201 is a network control unit, and 202 a modulator/demodulator. Reference numeral 203 is a recording device built in a facsimile apparatus A, for example, a thermosensitive recording device using a thermal head as its core, and 204 an external recording device connected via an output terminal 205 to the facsimile A, for which, for example, a laser beam printer, a LED printer, or the like is used. Incidentally, the internal recording device 203 and the external recording device 204 each are provided with an error detecting sensor (not shown) for detecting exhaustion of paper, stop of paper, or the like, respectively. The output terminal 205 has interface function, for which, for example, Centronicsparallel I/F (name of article) is suitably employed. Reference numeral 206 is an operation unit, which has a priority change-over switch 206a as a priority setting means and an error indicating unit 206b. Reference numeral 207 is a switching unit as a selection means which changes-over data buses of the internal recording device and the external recording device, and the internal recording device 203 and the external recording device 204 are alternatively connected to a CPU by the change-over. Reference numeral 208 is a reader for reading a manuscript, 209 a picture image memory which generally stores received contents in the case where the both internal and external recording devices are brought into a recording unable state due to exhaustion of paper, stop of paper, or the like, 210 a ROM for loading receiving programs, 211 a CPU for controlling these respective units, and 212 a RAM for storing various data which occur together with progress of the programs concerned.

Figure 10B:
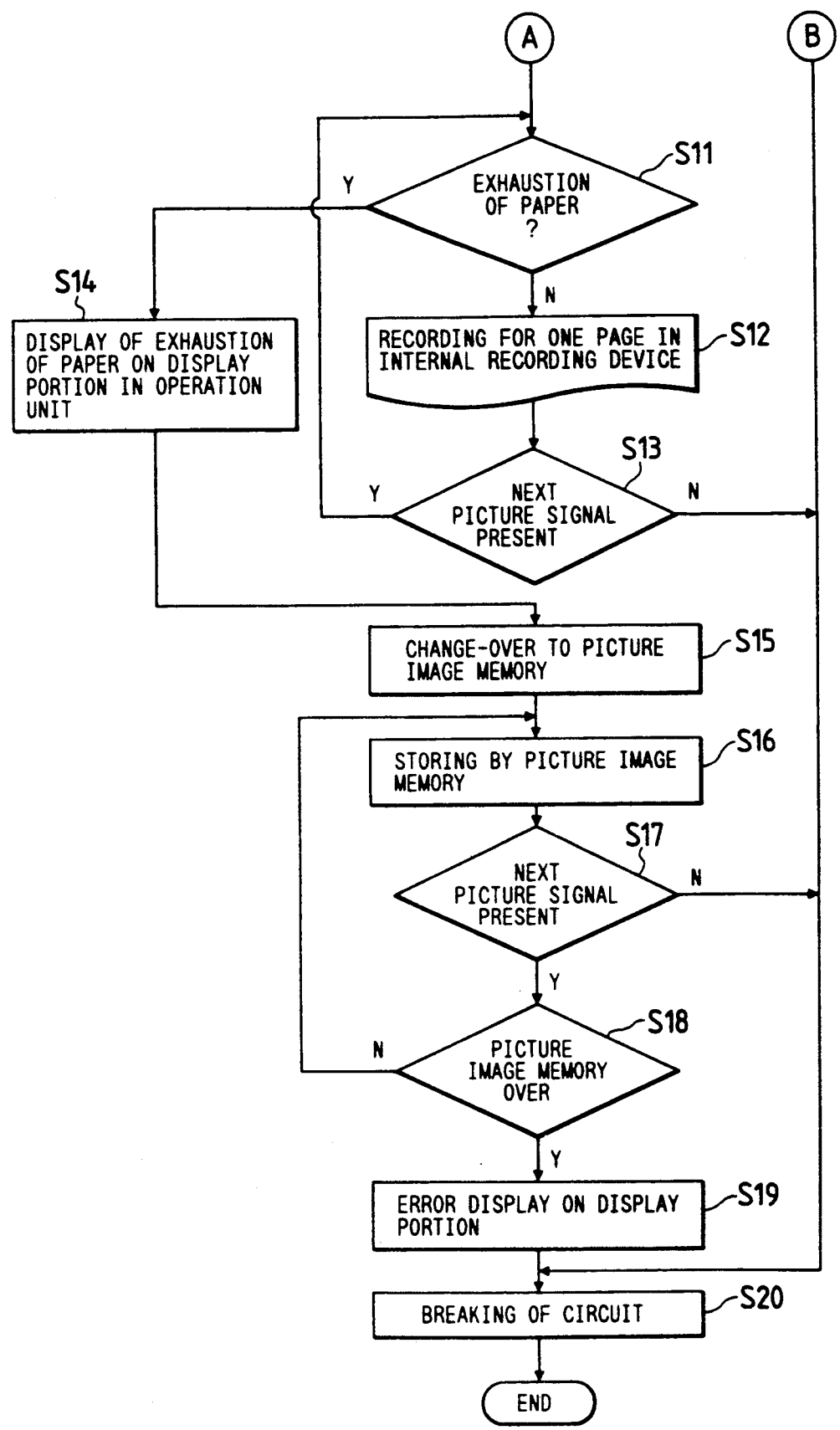
FIG. 10 is a flowchart of the recording operation of the facsimile apparatus.

Next, the detail of the recording operation will be described in accordance with a flowchart in the case where the external recording device shown in FIG. 10 has priority.

When the external recording device is selected by the priority change-over switch 206a in the operation unit (S1), the CPU receives a control signal from the external recording device and decides whether the external recording device 204 is connected to the connection cord 205 or not (S2). If the external recording device 204 is not connected to the connection cord 205, the CPU directs an operator to carry out the selection once more through a display device in the operation unit (S3). If the external recording device 204 is connected to the connection cord 205, the process proceeds to Step 204, and the CPU changes over the switching unit 207 to the side of the external recording device 204 after waiting for incoming of a called circuit. By this, the external recording device and the CPU are connected with each other through the data bus (S5). At this time, in the case where recording paper remains in a paper feeding portion in the external recording device, that is, exhaustion of paper does not occur, the process proceeds to Step 7, and a picture image data sent from a circuit is recorded for one page (S7). When an MPS (Multipage Signal) is received in a state into which a recording unable state due to exhaustion of paper, stop of paper, or the like is not brought, the recording for one page is carried out on all such occasions (S8), and when an EOP (End of Procedure) signal is received, the process proceeds to Step 20, performing treatment of "breaking of the circuit" and ending the reception.

On the other hand, when it is detected by the error detecting sensor that exhaustion of paper has occurred in the beginning of recording or in process of recording (S6), the effect is displayed in a display portion (S9), and at the same time, the switching unit 207 is changed over to the side of the internal recording device. By this, the CPU and the internal recording device are connected with each other through the data bus (S10), and hereafter a picture image data sent through a circuit from the internal recording device is recorded one page by one page (S12, S13). In this time, if a recording unable state due to exhaustion of paper, stop of paper, or the like occurs (S11), after the effect is displayed (S14), a picture image data sent from a circuit is provided to the picture image memory 209 through the CPU from the modem 202 without passing through the switching unit 207 and stored therein one page by one page. (S15, S16, and S17). In the case where an mount of picture images exceeds a memory capacity (S18), the effect is displayed in the display portion (S19), and at the same time, since a data which exceeds the above mentioned data can not be stored, treatment of "breaking of the circuit" is carried out (S20). Incidentally, in the embodiment, though the external recording device is made to have priority, it is, of course, possible to make the internal recording device have priority, and it is needless to say that the picture image memory 209 may be made to have priority.

As described above, according to the above embodiment of the present invention, the external recording device is connected to the facsimile apparatus provided with the built-in recording device, and in the case where one recording device is brought into a recording unable state due to exhaustion of paper, stop of paper, or the like, it is changed-over to the other recording device, allowing the recording. In the case where the both recording devices each are brought into a recording unable state, received contents are stored in the picture image memory in the facsimile apparatus. Since the recording is made to have priority in this way, even if a recording unable state due to exhaustion of paper, stop of paper, or the like occurs, the recording operation can be continuously carried out, improving convenience in its use.

In addition, since recently an electrophotographic recording device (a laser printer and the like) becomes relatively inexpensive in particular, and it has become possible using the present invention to connect the electrophotographic recording device to the thermosensitive recording facsimile apparatus, the present invention has the effect that it is possible to print on a plain paper other than a thermosensitive recording paper.

What is claimed is:

1. A facsimile apparatus for receiving and recording information transmitted from a transmitting device, comprising:
    a first selectable recording device for recording the information on a first recording medium;
    a second selectable recording device for recording the information on a second recording medium;
    length calculating means for calculating a length of the information to be recorded;
    selecting means for selecting one of the first and second selectable recording devices to record the information based on the calculated length of the information.

2. An apparatus according to claim 1, including memory means for storing the information to be recorded while the calculating means calculates the length, wherein the image is printed after the selecting means selects, based on the calculated length, which of the first and second selectable recording devices is to be utilized to record the information.

3. An apparatus according to claim 1, wherein the length calculating means includes a line detecting unit, a line number count unit responsive to the line detecting unit for storing line number count data, and a paper length storing unit for storing a total number of lines which can be recorded on a length of paper having a predetermined size.

4. An apparatus according to claim 3, wherein the first recording device includes a thermosensitive recording system and the second recording device includes an electrophotographic recording system.

* * * * *